US010083585B2

(12) United States Patent
Greenberg et al.

(10) Patent No.: US 10,083,585 B2
(45) Date of Patent: Sep. 25, 2018

(54) INTRUSION DETECTION SYSTEM AND METHOD

(71) Applicant: Tyco Fire & Security GmbH, Neuhausen am Rheinfall (CH)

(72) Inventors: Zeev Greenberg, Kfar Saba (IL); Daniel A. Rettig, Kfar Saba (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 165 days.

(21) Appl. No.: 15/210,580

(22) Filed: Jul. 14, 2016

(65) Prior Publication Data

US 2017/0018157 A1    Jan. 19, 2017

Related U.S. Application Data

(60) Provisional application No. 62/192,830, filed on Jul. 15, 2015.

(51) Int. Cl.
*H04N 7/18* (2006.01)
*G08B 13/196* (2006.01)
(Continued)

(52) U.S. Cl.
CPC ....... *G08B 13/19697* (2013.01); *G08B 13/08* (2013.01); *G08B 13/1966* (2013.01); *G08B 25/08* (2013.01); *H04N 7/188* (2013.01)

(58) Field of Classification Search
CPC ........ H04N 7/188; H04N 7/186; H04N 7/181; H04N 7/18; G08B 13/19697; G08B 13/08;
(Continued)

(56) References Cited

U.S. PATENT DOCUMENTS

| 6,057,764 A | 5/2000 | Williams |
| 2005/0099299 A1 | 5/2005 | Tyroler et al. |
| 2016/0189526 A1* | 6/2016 | Kennedy ............... G08B 13/08 340/541 |

FOREIGN PATENT DOCUMENTS

| EP | 2933783 A1 | 10/2015 |
| GB | 2402529 A | 8/2004 |

OTHER PUBLICATIONS

Office Action dated Sep. 13, 2016, from United Kingdom Patent Application No. GB1612277.2. Six pages.

* cited by examiner

*Primary Examiner* — Sherrie Hsia
(74) *Attorney, Agent, or Firm* — HoustonHogle LLP

(57) ABSTRACT

An intrusion detection system controller, including a restriction designator operable for pre-designating an individual for whom access to a portion of the premises is prohibited and, for each individual, pre-designating an individual-specific restricted portion of the premises to which access is prohibited; a designated individual presence ascertainer operable for ascertaining presence of a designated individual on the premises; an intrusion detector element communicator operable for communicating with detection elements, for receiving indications of detection of intrusions and, responsive thereto, for ascertaining an intruded portion of the premises and providing an output indicating detection of the intrusion in the intruded portion of the premises; and a restricted mode enforcer operable, responsive to ascertaining presence of the pre-designated individual and to receiving output indicating detection of the intrusion in the intruded portion, for ascertaining whether the intruded portion corresponds to the individual-specific restricted portion to which access of pre-designated individual is prohibited.

22 Claims, 2 Drawing Sheets

(51) Int. Cl.
*G08B 13/08* (2006.01)
*G08B 25/08* (2006.01)

(58) Field of Classification Search
CPC .......... G08B 13/1966; G08B 13/19602; G08B 25/08
USPC .................. 348/152, 155, 156, 700; 340/541
See application file for complete search history.

INTRUSION DETECTION SYSTEM AND METHOD

REFERENCE TO RELATED APPLICATIONS

This application claims the benefit under 35 USC 119(e) of U.S. Provisional Application No. 62/192,830, filed Jul. 15, 2015 and entitled "INTRUSION DETECTION SYSTEM AND METHOD", which is incorporated herein by reference in its entirety.

FIELD OF THE INVENTION

The present invention relates generally to improved intrusion detection systems and methods of operation thereof.

BACKGROUND OF THE INVENTION

Commercially available intrusion detection systems for protecting a premises are typically configured to operate, in either a disarmed mode of operation, a perimeter-armed mode of operation or a fully-armed mode of operation. The present invention seeks to provide novel modes of operation of intrusion detection systems.

SUMMARY OF THE INVENTION

The present invention seeks to provide an improved intrusion detection system and a method of operation thereof.

There is thus provided in accordance with a preferred embodiment of the present invention an intrusion detection system controller having at least a restricted mode of operation, the controller including a restriction designator operable for facilitating pre-designating at least one designated individual for whom access to at least one portion of the premises is prohibited and for facilitating, for each of the at least one designated individual, pre-designating at least one individual-specific restricted portion of the premises to which access of the pre-designated individual is prohibited; a designated individual presence ascertainer operable for ascertaining a presence of at least one of the at least one designated individual on the premises; an intrusion detector element communicator operable for continuously communicating with intrusion detection elements associated with an intrusion detection system arranged for detecting intrusions to the premises, and for receiving indications of detection of intrusions from the intrusion detection elements, responsive to the receiving, from at least one of the intrusion detection elements, an indication of detection of at least one intrusion, for ascertaining an intruded portion of the premises in which the at least one intrusion was detected, and responsive to the ascertaining the intruded portion of the premises, for providing an output indicating detection of the at least one intrusion in the intruded portion of the premises; and a restricted mode enforcer communicating with the restriction designator, the designated individual presence ascertainer and the intrusion detector element communicator, and operable, in the restricted mode of operation of the controller, responsive to the ascertaining, by the individual presence ascertainer, the presence of the at least one pre-designated individual on the premises and responsive to receiving, from the intrusion detector element communicator, the output indicating detection of the at least one intrusion in the intruded portion of the premises, for ascertaining whether the intruded portion of the premises corresponds to the at least one individual-specific restricted portion of the premises to which access of the pre-designated individual is prohibited, responsive to ascertaining that the intruded portion of the premises corresponds to the at least one individual-specific restricted portion of the premises to which access of the pre-designated individual is prohibited, for responding to the output, and responsive to ascertaining that the intruded portion of the premises does not correspond to the at least one individual-specific restricted portion of the premises to which access of the pre-designated individual is prohibited, for ignoring the output.

Preferably, the controller is operable to be configured to operate in the restricted mode of operation by an administrator of the intrusion detection system.

Preferably, the presence of the at least one designated individual on the premises is ascertained by the designated individual presence ascertainer in response to entering of a unique access code to the intrusion detection system by the at least one pre-designated individual, the unique access code being pre-assigned to the at least one designated individual.

Preferably, the intrusion detection elements include at least one of a motion detector, a door\window contact element and a camera.

Preferably, the controller also includes an intrusion notifier communicating with the restricted mode enforcer and operable, responsive to the responding to the output, for notifying an administrator of the intrusion detection system of the at least one intrusion in the intruded portion of the premises via a mobile device associated with the administrator of the intrusion detection system.

Preferably, the intrusion notifier is operative to notify the administrator by at least one of a textual notification and an image of a site of each of the intrusions.

Preferably, the controller also includes an intrusion detection element remote controller communicating with the intrusion detection elements and operable for facilitating remote control of the intrusion detection elements via a mobile device associated with the administrator of the intrusion detection system.

Preferably, the controller also includes a disarmed mode enforcer communicating with the intrusion detector element communicator and operable, in a disarmed mode of operation of the controller, for ignoring the indications of the intrusions to any portion of the premises.

Preferably, the controller also includes a perimeter-armed mode enforcer communicating with the intrusion detector element communicator and operable, in a perimeter-armed mode of operation of the controller, responsive to receiving, from the intrusion detector element communicator, the output indicating detection of the at least one intrusion in the intruded portion of the premises, for ascertaining whether the intruded portion of the premises corresponds to a perimeter of the premises, responsive to ascertaining that the intruded portion of the premises corresponds to a perimeter of the premises, for responding to the output, and responsive to ascertaining that the intruded portion of the premises does not correspond to a perimeter of the premises, for ignoring the output.

Preferably, the perimeter-armed mode enforcer is also operable, responsive to the responding to the output, for instructing the intrusion detection system to sound an alarm.

Preferably, the controller also includes a fully-armed mode enforcer communicating with the intrusion detector element communicator and operable, in a fully-armed mode of operation of the controller, responsive to receiving, from the intrusion detector element communicator, the output indicating detection of the at least one intrusion in the intruded portion of the premises, for responding to the output. Preferably, the fully-armed mode enforcer is also operable, responsive to the responding to the output, to instruct the intrusion detection system to sound an alarm.

There is also provided in accordance with another preferred embodiment of the present invention a method for detecting intrusions to a premises, the method including pre-designating at least one pre-designated individual for whom access to at least one portion of the premises is prohibited; for each of the at least one pre-designated individual, pre-designating at least one individual-specific restricted portion of the premises to which access of the pre-designated individual is prohibited; ascertaining a presence of at least one of the at least one pre-designated individual on the premises; continuously communicating with intrusion detection elements associated with an intrusion detection system arranged for detecting intrusions to the premises, and receiving indications of detection of intrusions from the intrusion detection elements; responsive to the receiving, from at least one of the intrusion detection elements, an indication of detection of at least one intrusion, ascertaining an intruded portion of the premises in which the at least one intrusion was detected; responsive to the ascertaining the intruded portion of the premises, providing an output indicating detection of the at least one intrusion in the intruded portion of the premises; responsive to the ascertaining the presence of the at least one pre-designated individual on the premises and responsive to receiving the output indicating detection of the at least one intrusion in the intruded portion of the premises, ascertaining whether the intruded portion of the premises corresponds to the at least one individual-specific restricted portion of the premises to which access of the pre-designated individual is prohibited; responsive to ascertaining that the intruded portion of the premises corresponds to the at least one individual-specific restricted portion of the premises to which access of the pre-designated individual is prohibited, responding to the output; and responsive to ascertaining that the intruded portion of the premises does not correspond to the at least one individual-specific restricted portion of the premises to which access of the pre-designated individual is prohibited, ignoring the output.

Preferably, the responding to the output indicating that the intruded portion of the premises corresponds to the at least one individual-specific restricted portion of the premises to which access of the pre-designated individual is prohibited, and the ignoring the output indicating that the intruded portion of the premises does not correspond to the at least one individual-specific restricted portion of the premises to which access of the pre-designated individual is prohibited, are in response to receiving an instruction from an administrator of the intrusion detection system.

Preferably, ascertaining the presence of the at least one pre-designated individual on the premises is in response to the at least one of the at least one pre-designated individual providing a unique access code to the intrusion detection system, the unique access code being pre-assigned to the at least one designated individual.

Preferably, the intrusion detection elements include at least one of a motion detector, a door\window contact element and a camera.

Preferably, the method also includes, responsive to the responding to the output, notifying an administrator of the intrusion detection system of the at least one intrusion in the intruded portion of the premises via a mobile device associated with the administrator of the intrusion detection system. Preferably, the notifying includes notifying the administrator by at least one of a textual notification and an image of a site of each of the intrusions.

Preferably, the method also includes, facilitating remote control of the intrusion detection elements via a mobile device associated with the administrator of the intrusion detection system.

Preferably, the method also includes, responsive to receiving an instruction from the administrator of the intrusion detection system, ignoring the indications of the intrusions to any portion of the premises.

Preferably, the method also includes, responsive to receiving an instruction from an administrator of the intrusion detection system and responsive to receiving, from the intrusion detector element communicator, the output indicating detection of the at least one intrusion in the intruded portion of the premises ascertaining whether the intruded portion of the premises corresponds to a perimeter of the premises, responsive to ascertaining that the intruded portion of the premises corresponds to a perimeter of the premises, responding to the output, and responsive to ascertaining that the intruded portion of the premises does not correspond to a perimeter of the premises, ignoring the output. Preferably, the method also includes, responsive to responding to the output, sounding an alarm.

Preferably, the method also includes, responsive to receiving an instruction from an administrator of the intrusion detection system and responsive to receiving the output indicating detection of the at least one intrusion in the intruded portion of the premises, responding to the output. Preferably, the method also includes, responsive to responding to the output, sounding an alarm.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
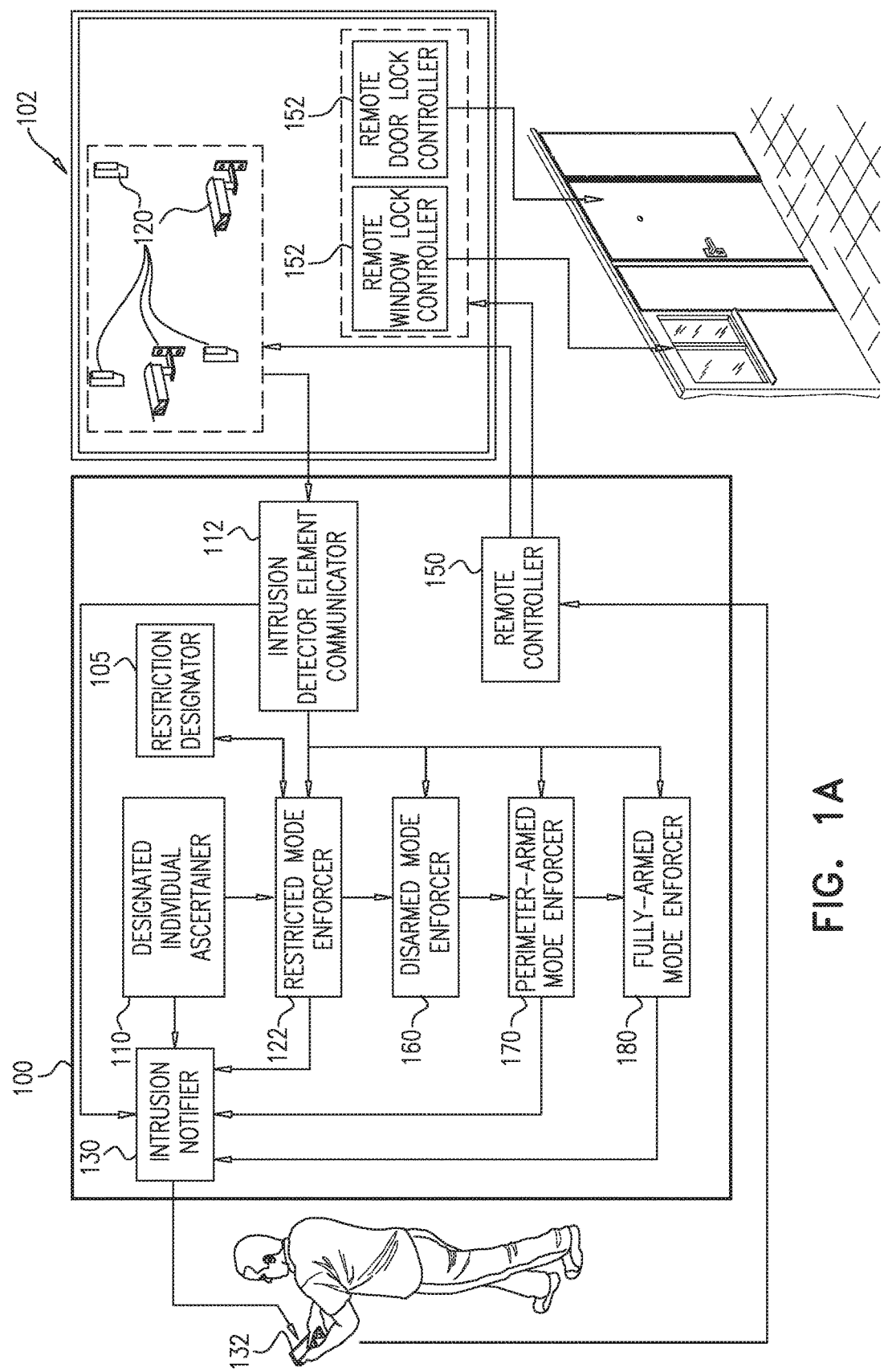
FIG. 1A is a simplified block diagram illustration of an intrusion detection system constructed and operative in accordance with a preferred embodiment of the present invention.

The present invention provides an improved intrusion detection system. Commercially available intrusion detection systems for protecting a premises are typically configured to operate, in response to a suitable instruction from an administrator of the system, in at least some of the following modes of operation:

a disarmed mode of operation, in which the system is configured to ignore intrusions to the premises;

a perimeter-armed mode of operation, in which the system is configured to provide an alert in response to intrusions of a perimeter of the premises; and a fully-armed mode of operation, in which the system is configured to provide an alert in response to intrusions to any portion of the premises, such as, for example, one or more specific locations in an interior of the premises and a perimeter of the premises.

It is a particular feature of the present invention that the system is also configured to operate, in response to a suitable instruction from an administrator of the system, in a restricted mode of operation. In the restricted mode of operation, the system is preferably configured, in response to ascertaining the presence of at least one pre-designated individual on the premises, to alert an administrator of intrusions to an individual-specific pre-designated restricted portion of the premises while ignoring intrusions to the remainder of the premises. The individual-specific pre-designated restricted portion of the premises of the premises is preferably designated by an administrator of the system.

For example, an administrator of the system such as, for example, a parent, may instruct the system, in response to detecting the presence of a designated child in the family residence, to provide an alert to the parent only in response to entry via the front door of the residence, while allowing the child to freely move about the remainder of the residence, without generating an alert. Detection of such intrusions may be achieved, for example, by employing a door contact or a camera installed in the vicinity of the front door.

Furthermore, for example, the parent may instruct the system, in response to detecting the presence of the designated child in the residence, to provide an alert to the parent in response to access of the child to a cabinet containing hazardous substances such as medications, hazardous cleaning material and tools. Detection of such access may be achieved, for example, by employing motion detectors, door contacts or cameras installed in the vicinity of the hazardous substances.

Additionally, for example, in a case where the system of the present invention is installed at a residence where a home automation is installed and configured for controlling various components of the residence, the parent may instruct the system, in response to detecting the presence of the designated child in the residence, to employ the home automation system to disable at least some of the components. For example, it may be desirable to prevent a child from opening a window or a door leading to a balcony.

The child is preferably provided with a unique access code to the system to be entered upon entering the residence. The restricted mode of operation is preferably activated, for example, upon entering the unique access code, which indicates the presence of the child in the residence. It is appreciated that different individuals may be provided with different access codes, thereby facilitating detection of restricted access to different portions of the residence, corresponding to the protection desired for each of the different individuals. It is appreciated that, alternatively, other mechanisms by which presence of a designated individual on the premises may be employed. For example, the designated individual may carry a RFID device and configured for broadcasting an identification code assigned to the designated individual to a suitable receiver communicating with the system.

Alternatively, the restricted mode of operation may be activated by an administrator of the system, such as a parent, upon leaving the residence, in a case where one or more children remain in the residence. Activation of the restricted mode of operation may be achieved, for example, by pressing on a designated key on a keypad associated with the system, by entering a pre-designated code, or by pressing on any other suitable pre-designated combination of keys.

It is further appreciated that the system is also operative to notify the administrator of an intrusion to the premises or to a restricted portion of the premises such as via a mobile device of the administrator. The notification may include, for example, a sound emitted by the system or a textual notification or an image captured by a camera at the site of intrusion and delivered to the mobile device. The mobile device may be, for example, a mobile telephone, a pager, a handheld computing device or any other suitable communicator device.

Preferably, the administrator may employ remote control capabilities installed on the mobile device to remotely control elements of the system, such as to remotely lock or unlock doors on the premises, or to obtain visual access to the premises, via cameras installed at the premises.

The system is also preferably operative to sound an alarm in response to an intrusion to the premises.

It is yet further appreciated that functionality enabling the restricted mode of operation may be provided to existing or previously installed intrusion detection systems by providing a firmware upgrade of the system.

Reference is now made to FIG. 1A, which is a simplified block diagram illustration of the intrusion detection system described hereinabove, constructed and operative in accordance with a preferred embodiment of the present invention.

As shown in FIG. 1A, an intrusion detection system controller 100 is provided for controlling an intrusion detection system 102, intrusion detection system 102 being operable for protecting a premises. Controller 100 may be provided, for example, as part of a pre-installed intrusion detection system 102, separately from intrusion detection system 102, or as a firmware upgrade of intrusion detection system 102.

Controller 100 preferably includes a restriction designator 105 operable for facilitating pre-designating at least one designated individual for whom access to at least one portion of the premises is prohibited and for facilitating, for each of the at least one designated individual, pre-designating at least one individual-specific restricted portion of the premises to which access of the pre-designated individual is prohibited. It is appreciated that the individual-specific restricted portion of the premises to which access of the pre-designated individual is prohibited may differ for different individuals.

Controller 100 preferably also includes a designated individual ascertainer 110 operable for ascertaining a presence of at least one designated individual on the premises.

Controller 100 preferably also includes an intrusion detector element communicator 112 operable for continuously communicating with intrusion detection elements 120 associated with intrusion detection system 102, intrusion detection elements 120 being arranged for detecting intrusions to the premises, and for receiving indications of the intrusions therefrom. Intrusion detector element communicator 112 is also preferably operable, responsive to receiving, from intrusion detection elements 120, an indication of detection of at least one intrusion, for ascertaining an intruded portion of the premises in which the intrusion was detected, and responsive to ascertaining the intruded portion of the premises, for providing an output indicating detection of the intrusion in the intruded portion of the premises. It is appreciated that ascertaining an intruded portion of the premises in which the intrusion was detected may be achieved, for example, by analyzing a code assigned to the intrusion detection element 120 providing the intrusion indication.

Controller 100 preferably also includes a restricted mode enforcer 122 communicating with restriction designator 105, designated individual presence ascertainer 110 and intrusion detector element communicator 112, and operable, in a restricted mode of operation of controller 100, responsive to ascertaining, by individual presence ascertainer 110, the presence of a pre-designated individual on the premises and responsive to receiving, from intrusion detector element communicator 112, output indicating detection of at least one intrusion in the intruded portion of the premises, for ascertaining whether the intruded portion of the premises corresponds to an individual-specific restricted portion of the premises to which access of the pre-designated individual is prohibited. Responsive to ascertaining that the intruded portion of the premises corresponds to the individual-specific restricted portion of the premises to which access of the pre-designated individual is prohibited, restricted mode enforcer 122 preferably responds to the output. Responsive to ascertaining that the intruded portion of the premises does not correspond to the individual-specific restricted portion of the premises to which access of the pre-designated individual is prohibited, restricted mode enforcer 122 preferably ignores the output.

As described hereinabove, the administrator of intrusion detection system 102 may be, for example, a parent of a child. As further described hereinabove, the designated individual may be a designated child for whom the parent requests to limit access to a designated portion of the family residence.

It is appreciated that controller 100 is preferably configured to operate in the restricted mode of operation by an administrator of intrusion detection system 102, such as, for example, an owner of the premises. The administrator may activate the restricted mode of operation, for example, by entering a unique access code to system 102, such as via a keypad provided with system 102.

The presence of the designated individual on the premises is preferably ascertained by designated individual ascertainer 110 in response to entering of a unique access code to system 102, the access code being assigned to the designated individual. It is appreciated that, alternatively, other mechanisms by which presence of a designated individual on the premises may be employed. For example, the designated individual may carry a RFID device and configured for broadcasting an identification code assigned to the designated individual to a suitable receiver communicating with system 102.

It is appreciated that intrusion detection elements 120 may include, for example, motion detectors, door\window contact elements and cameras.

Controller 100 also preferably includes an intrusion notifier 130 operative to notify an administrator of system 100 of intrusion detection indicating output responded to by restricted mode enforcer 122, via a mobile device 132 of the administrator. Intrusion notifier 130 is preferably operative to notify the administrator, for example, via a textual notification or an image of a site of each of the intrusions, the image preferably received from a suitable one of intrusion detection elements 120 via intrusion detector element communicator 112. Mobile device 132 may be, for example, a mobile telephone, a pager, a handheld computing device or any other suitable communicator device.

Controller 100 further preferably includes a remote controller 150 operable for facilitating remote control of intrusion detection elements 120. Preferably, the administrator may employ remote control capabilities installed on mobile device 132 to remotely control intrusion detection elements 120 of system 102 via intrusion detection element remote controller 150, such as to obtain visual access to the premises, via cameras installed at the premises.

Remote controller 150 is also preferably operable for facilitating remote control of various components 152 of the residence, such as the locking mechanisms of windows and doors of the premises. The administrator may, for example, employ remote control capabilities installed on mobile device 132 to remotely control components 152 via remote controller 150, to remotely lock or unlock doors or windows on the premises.

Controller 100 preferably also includes a disarmed mode enforcer 160 operable, in a disarmed mode of operation of controller 100, to ignore indications of intrusions to the premises. Controller 100 also preferably includes a perimeter-armed mode enforcer 170 operable, in a perimeter-armed mode of operation of controller 100, to respond to indications of intrusions of a perimeter of the premises while ignoring indications of intrusions to a remainder of the premises. Controller 100 also preferably includes a fully-armed mode enforcer 180 operable, in a fully-armed mode of operation of controller 100, to respond to indications of intrusions to any portion of the premises, such as one or more specific locations in an interior of the premises and a perimeter of the premises. It is appreciated that controller 100 is preferably configured to operate in any of the disarmed mode of operation, the perimeter-armed mode of operation and the fully-armed mode of operation in response to receiving a suitable instruction from the administrator, such as, for example, by entering a unique access code to system 102.

As described hereinabove, intrusion notifier 130 is operative to notify an administrator of system 100 of each of the heeded intrusions via a mobile device of the authorized user. Furthermore, controller 100 is preferably operable, responsive to heeding any of the aforementioned indications of intrusions, to instruct intrusion detection system 102 to sound a suitable alarm.

It is appreciated that each of elements 100, 105, 110, 122, 130, 150, 160, 170 and 180 may comprise, for example, a computer processor, a computer sub-processor or a computer task processor.

Figure 1B:
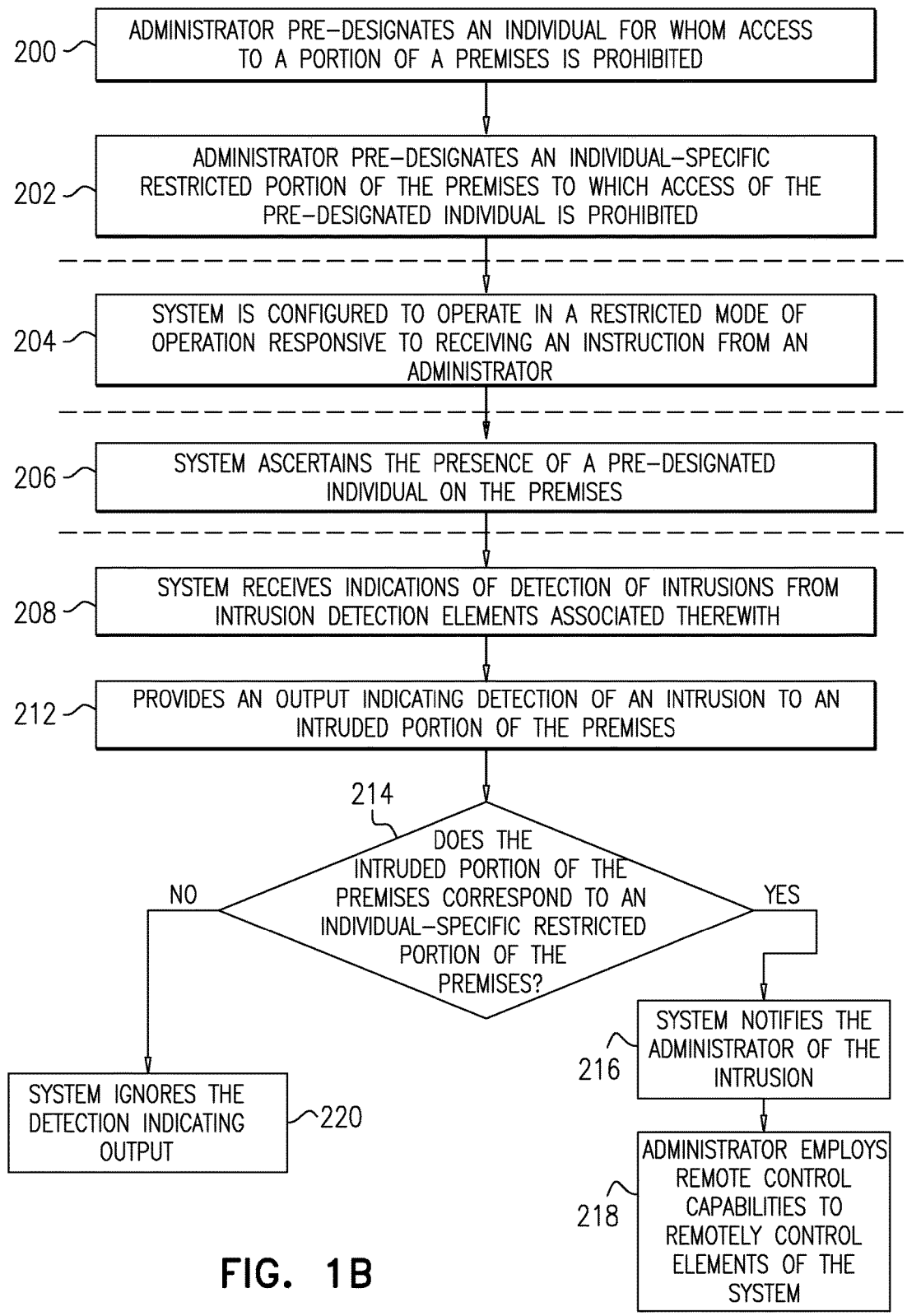
FIG. 1B is a simplified flowchart of the operation of the system of FIG. 1A in a restricted mode of operation.

Reference is now made to FIG. 1B, which is a simplified flowchart of the operation of the system of FIG. 1A in a restricted mode of operation.

As shown in FIG. 1B, an administrator of the system preferably pre-designates at least one pre-designated individual for whom access to at least one portion of a premises is prohibited (200). For each of the pre-designated individuals the administrator then preferably pre-designates at least one individual-specific restricted portion of the premises to which access of the pre-designated individual is prohibited (202).

The system is preferably configured to operate in a restricted mode of operation responsive to receiving an instruction from an administrator of the system (204). As described hereinabove with reference to FIG. 1A, in the restricted mode of operation, the system is preferably configured, in response to ascertaining the presence of at least one designated individual on the premises, to notify an administrator of intrusions to a particular restricted portion of the premises while ignoring intrusions to the remainder of the premises.

For example, an administrator of the system such as, for example, a parent, may instruct the system, in response to detecting the presence of a designated child in the family residence, to provide an alert in response to entry via the front door of the residence, while allowing the child to freely move about the remainder of the residence, without generating an alert. Detection of such intrusions may be achieved, for example, by employing a door contact or a camera installed in the vicinity of the front door.

Furthermore, for example, the parent may instruct the system, in response to detecting the presence of the designated child in the residence, to provide an alert in response to access of the child to a cabinet containing hazardous substances such as medications, hazardous cleaning material and tools. Detection of such access may be achieved, for example, by employing motion detectors, door contacts or cameras installed in the vicinity of the hazardous substances.

Additionally, for example, in a case where the system of the present invention is installed at a residence where a home automation is installed and configured for controlling various components of the residence, the parent may instruct the system, in response to detecting the presence of the designated child in the residence, to employ the home automation system to disable at least some of the components. For example, it may be desirable to prevent a child from opening a window or a door leading to a balcony.

The child is preferably provided with a unique access code to the system to be entered upon entering the residence. The restricted mode of operation is preferably activated, for example, upon entering the unique access code, which indicates the presence of the child in the residence. It is appreciated that different individuals may be provided with different access codes, thereby enabling protection of different portions of the residence, corresponding to the protection desired for each of the different individuals. It is appreciated that, alternatively, other mechanisms by which presence of a designated individual on the premises may be employed. For example, the designated individual may carry a RFID device and configured for broadcasting an identification code assigned to the designated individual to a suitable receiver communicating with the system.

Alternatively, the restricted mode of operation may be activated by an administrator of the system upon leaving the residence, in a case where one or more children remain in the residence.

At a later time, the system preferably ascertains the presence of a pre-designated individual on the premises (206). As described hereinabove with reference to FIG. 1A, presence of the designated individual may be ascertained, for example, by entering, by the designated individual, a unique access code assigned thereto upon entering the residence. It is appreciated that different individuals may be provided with different access codes, thereby facilitating detection of restricted access to different portions of the residence, corresponding to the protection desired for each of the different individuals. It is appreciated that, alternatively, other mechanisms by which presence of a designated individual on the premises may be employed. For example, the designated individual may carry a RFID device and configured for broadcasting an identification code assigned to the designated individual to a suitable receiver communicating with the system.

The system may then receive indications of detection of intrusions from intrusion detection elements associated therewith (208). Responsive to receiving, from a detection element, an indication of detection of an intrusion to an intruded portion of the premises, the system preferably provides an output indicating detection of an intrusion to an intruded portion of the premises (212). Responsive to ascertaining the presence of the pre-designated individual on the premises and responsive to receiving the output indicating detection of the intrusion to the intruded portion of the premises, the system then ascertains whether the intruded portion of the premises corresponds to an individual-specific restricted portion of the premises to which access of the pre-designated individual is prohibited (214). Responsive to ascertaining that the intruded portion of the premises corresponds to an individual-specific restricted portion of the premises to which access of the pre-designated individual is prohibited, the system responds to the detection indicating output (216). Responding to the detection indicating output preferably includes notifying the administrator of the intrusion, for example, via a mobile device of the administrator. The notification may include, for example, a textual notification or an image captured by a camera at the site of intrusion. The mobile device may be, for example, a mobile telephone, a pager, a handheld computing device or any other suitable communicator device. The administrator may then employ remote control capabilities installed on the mobile device to remotely control elements of the system, such as to remotely lock or unlock doors on the premises, or to obtain visual access to the premises, via cameras installed at the premises (218).

Responsive to ascertaining that the intruded portion of the premises does not correspond to an individual-specific restricted portion of the premises to which access of the pre-designated individual is prohibited, the system ignores the detection indicating output (220).

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. An intrusion detection system controller having at least a restricted mode of operation, said controller comprising:
   a restriction designator operable:
     for facilitating pre-designating at least one designated individual for whom access to at least one portion of a premises is prohibited; and
     for facilitating, for each of said at least one designated individual, pre-designating at least one individual-specific restricted portion of said premises to which access of said pre-designated individual is prohibited;
   a designated individual presence ascertainer operable for ascertaining a presence of at least one of said at least one designated individual on said premises;
   an intrusion detector element communicator operable:
     for continuously communicating with intrusion detection elements associated with an intrusion detection system arranged for detecting intrusions to said premises, and for receiving indications of detection of intrusions from said intrusion detection elements;
     responsive to said receiving, from at least one of said intrusion detection elements, an indication of detection of at least one intrusion, for providing an output indicating detection of said at least one intrusion to an intruded portion of said premises;
   a restricted mode enforcer communicating with said restriction designator, said designated individual presence ascertainer and said intrusion detector element communicator, and operable, in said restricted mode of operation of said controller, responsive to said ascertaining, by said individual presence ascertainer, said presence of said at least one pre-designated individual on said premises and responsive to receiving, from said intrusion detector element communicator, said output indicating detection of said at least one intrusion to said intruded portion of said premises:

for ascertaining whether said intruded portion of said premises corresponds to said at least one individual-specific restricted portion of said premises to which access of said pre-designated individual is prohibited;

responsive to ascertaining that said intruded portion of said premises corresponds to said at least one individual-specific restricted portion of said premises to which access of said pre-designated individual is prohibited, for responding to said output; and responsive to ascertaining that said intruded portion of said premises does not correspond to said at least one individual-specific restricted portion of said premises to which access of said pre-designated individual is prohibited, for ignoring said output; and a perimeter-armed mode enforcer communicating with said intrusion detector element communicator and operable, in a perimeter-armed mode of operation of said controller, responsive to receiving, from said intrusion detector element communicator, said output indicating detection of said at least one intrusion in said, intruded portion of said premises:

for ascertaining whether said intruded portion of said premises corresponds to a perimeter of said premises;

responsive to ascertaining that said intruded portion of said premises corresponds to a perimeter of said premises, for responding to said output; and responsive to ascertaining that said intruded portion of said premises does not correspond to a perimeter of said premises, for ignoring said output.

2. An intrusion detection system controller according to claim 1 and wherein said controller is operable to be configured to operate in said restricted mode of operation by an administrator of said intrusion detection system.

3. An intrusion detection system controller according to claim 1 and wherein said presence of said at least one designated individual on said premises is ascertained by said designated individual presence ascertainer in response to entering of a unique access code to said intrusion detection system by said at least one pre-designated individual, said unique access code being pre-assigned to said at least one designated individual.

4. An intrusion detection system controller according to claim 1 and wherein said intrusion detection elements comprise at least one of a motion detector, a door\window contact element and a camera.

5. An intrusion detection system controller according to claim 1 and also comprising an intrusion notifier communicating with said restricted mode enforcer and operable, responsive to said responding to said output, for notifying an administrator of said intrusion detection system of said at least one intrusion in said intruded portion of said premises via a mobile device associated with said administrator of said intrusion detection system.

6. An intrusion detection system controller according to claim 5 and wherein said intrusion notifier is operative to notify said administrator by at least one of a textual notification and an image of a site of each of said intrusions.

7. An intrusion detection system controller according to claim 1 and also comprising an intrusion detection element remote controller communicating with said intrusion detection elements and operable for facilitating remote control of said intrusion detection elements via a mobile device associated with said administrator of said intrusion detection system.

8. An intrusion detection system controller according to claim 1 and also comprising a disarmed mode enforcer communicating with said intrusion detector element communicator and operable, in a disarmed mode of operation of said controller, for ignoring said indications of said intrusions to any portion of said premises.

9. An intrusion detection system controller according to claim 1 and wherein said perimeter-armed mode enforcer is also operable, responsive to said responding to said output, for instructing said intrusion detection system to sound an alarm.

10. An intrusion detection system controller according to claim 1 and also comprising a fully-armed mode enforcer communicating with said intrusion detector element communicator and operable, in a fully-armed mode of operation of said controller, responsive to receiving, from said intrusion detector element communicator, said output indicating detection of said at least one intrusion in said intruded portion of said premises, for responding to said output.

11. An intrusion detection system controller according to claim 10 and wherein said fully-armed mode enforcer is also operable, responsive to said responding to said output, to instruct said intrusion detection system to sound an alarm.

12. A method for detecting intrusions to a premises, said method comprising:

pre-designating at least one pre-designated individual for whom access to at least one portion of said premises is prohibited;

for each of said at least one pre-designated individual, pre-designating at least one individual-specific restricted portion of said premises to which access of said pre-designated individual is prohibited;

ascertaining a presence of at least one of said at least one pre-designated individual on said premises;

continuously communicating with intrusion detection elements associated with an intrusion detection system arranged for detecting intrusions to said premises, and receiving indications of detection of intrusions to intruded portions of said premises from said intrusion detection elements;

responsive to said receiving, from at least one of said intrusion detection elements, an indication of detection of at least one intrusion, providing an output indicating detection of said at least one intrusion to an intruded portion of said premises;

responsive to said ascertaining said presence of said at least one pre-designated individual on said premises and responsive to receiving said output indicating detection of said at least one intrusion to said intruded portion of said premises:

ascertaining whether said intruded portion of said premises corresponds to said at least one individual-specific restricted portion of said premises to which access of said pre-designated individual is prohibited;

responsive to ascertaining that said intruded portion of said premises corresponds to said at least one individual-specific restricted portion of said premises to which access of said pre-designated individual is prohibited, responding to said output; and responsive to ascertaining that said intruded portion of said premises does not correspond to said at least one individual-specific restricted portion of said premises to which access of said pre-designated individual is prohibited, ignoring said output; and responsive to receiving an instruction from an administrator of said intrusion detection system and responsive to receiving, from said intrusion detector element communicator, said output indicating detection of said at least one intrusion in said intruded portion of said premises:

ascertaining whether said intruded portion of said premises corresponds to a perimeter of said premises;

responsive to ascertaining that said intruded portion of said premises corresponds to a perimeter of said premises, responding to said output; and responsive to ascertaining that said intruded portion of said premises does not correspond to a perimeter of said premises, ignoring said output.

13. A method for detecting intrusions to a premises according to claim 12 and wherein said responding to said output indicating that said intruded portion of said premises corresponds to said at least one individual-specific restricted portion of said premises to which access of said pre-designated individual is prohibited, and said ignoring said output indicating that said intruded portion of said premises does not correspond to said at least one individual-specific restricted portion of said premises to which access of said pre-designated individual is prohibited, are in response to receiving an instruction from an administrator of said intrusion detection system.

14. A method for detecting intrusions to a premises according to claim 12 and wherein said ascertaining said presence of said at least one pre-designated individual on said premises is in response to said at least one of said at least one pre-designated individual providing a unique access code to said intrusion detection system, said unique access code being pre-assigned to said at least one designated individual.

15. A method for detecting intrusions to a premises according to claim 12 and wherein said intrusion detection elements comprise at least one of a motion detector, a door\window contact element and a camera.

16. A method for detecting intrusions to a premises according to claim 12 and also comprising, responsive to said responding to said output, notifying an administrator of said intrusion detection system of said at least one intrusion in said intruded portion of said premises via a mobile device associated with said administrator of said intrusion detection system.

17. A method for detecting intrusions to a premises according to claim 16 and wherein said notifying comprises notifying said administrator by at least one of a textual notification and an image of a site of each of said intrusions.

18. A method for detecting intrusions to a premises according to claim 12 and also comprising facilitating remote control of said intrusion detection elements via a mobile device associated with said administrator of said intrusion detection system.

19. A method for detecting intrusions to a premises according to claim 12 and also comprising, responsive to receiving an instruction from said administrator of said intrusion detection system, ignoring said indications of said intrusions to any portion of said premises.

20. A method for detecting intrusions to a premises according to claim 12 and also comprising, responsive to said responding to said output, sounding an alarm.

21. A method for detecting intrusions to a premises according to claim 12 and also comprising, responsive to receiving an instruction from an administrator of said intrusion detection system and responsive to receiving said output indicating detection of said at least one intrusion in said intruded portion of said premises, responding to said output.

22. A method for detecting intrusions to a premises according to claim 21 and also comprising, responsive to said responding to said output, sounding an alarm.

* * * * *